US006325185B1

(12) United States Patent
Doi et al.

(10) Patent No.: US 6,325,185 B1
(45) Date of Patent: Dec. 4, 2001

(54) BRAKE DISC ROTOR

(75) Inventors: Kazuhiro Doi, Kanagawa-ken; Takashi Matsubara, Yamaguchi-ken; Tsutomu Hamabe; Masahiro Kubota, both of Kanagawa-ken, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/356,695

(22) Filed: Jul. 20, 1999

(30) Foreign Application Priority Data

Jul. 29, 1998 (JP) .................................................. 10-214393

(51) Int. Cl.$^7$ .................................................. F16D 65/10
(52) U.S. Cl. .............................. 188/218 XL; 188/264 A
(58) Field of Search ........................ 188/218 XL, 264 A, 188/264 AA, 218 A (56) References Cited

U.S. PATENT DOCUMENTS

| | | | | |
|---|---|---|---|---|
| 3,809,192 | * | 5/1974 | Stehle | 188/218 XL |
| 4,132,294 | * | 1/1979 | Poli | 188/218 XL |
| 4,379,501 | * | 4/1983 | Hagiwara | 188/218 XL |
| 4,523,666 | * | 6/1985 | Murray | 188/218 XL |
| 5,526,905 | * | 6/1996 | Shimazu | 188/218 XL |
| 5,957,249 | * | 9/1999 | Yamazaki | 188/218 XL |
| 6,145,636 | * | 11/2000 | Ikari | 188/218 XL |

FOREIGN PATENT DOCUMENTS

| | | | |
|---|---|---|---|
| 2125911 | * | 3/1984 | (GB) . |
| 06-280278 | | 10/1997 | (JP) . |
| 09280278-A1 | * | 10/1997 | (JP) . |

OTHER PUBLICATIONS

Harada et al.; "Study on Brake Noise (2nd Report, on Disc Brake Squeal)"; Society of Mechanical Engineers Paper; vol. 55, No. 122; 1989; pp. 932–939.

* cited by examiner

Primary Examiner—Daniel G. DePumpo
Assistant Examiner—David Divine
(74) Attorney, Agent, or Firm—Foley & Lardner (57) ABSTRACT

Disclosed is a brake disc rotor comprising a first disc plate, a second disc plate facing the first disc plate, a plurality of fins arranged in the radial direction of the brake disc rotor between the first and second disc plates, and a plurality of ventilation holes each of which is positioned between neighboring fins of the plurality of fins and communicates a space on the inner circumferential side and a space on the outer circumferential side in the radial direction of the brake disc rotor. The plurality of fins have a plurality of sets each including two long fins and two short fins, one of the two long fins has an expanded part which is expanded in its width direction, the long fins and the short fins are alternately arranged in the circumferential direction of the brake disc rotor in each of the plurality of sets, and the plurality of sets are arranged at equal intervals in the circumferential direction of the brake disc rotor.

17 Claims, 8 Drawing Sheets

BRAKE DISC ROTOR

BACKGROUND OF THE INVENTION

The present invention relates to a brake disc rotor of a disc brake device for a vehicle. More particularly, the invention relates to a ventilated type brake disc rotor in which fins are radially provided between opposed disc plates and ventilation holes are opened between the fins.

Society of Mechanical Engineers paper (Vol. 55, 122nd issue, No. 88-0622A) and Japanese Patent Application Laid-Open No. 9-280278 disclose conventional ventilated type brake disc rotors.

SUMMARY OF THE INVENTION

Figure 9:
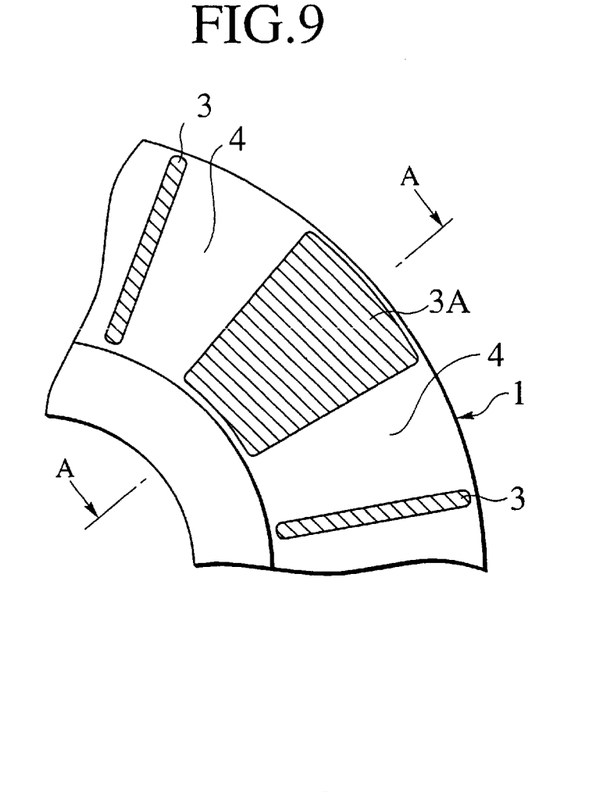
FIG. 9 is a partial cross section of a brake disc rotor examined by the inventors.
Figure 10:
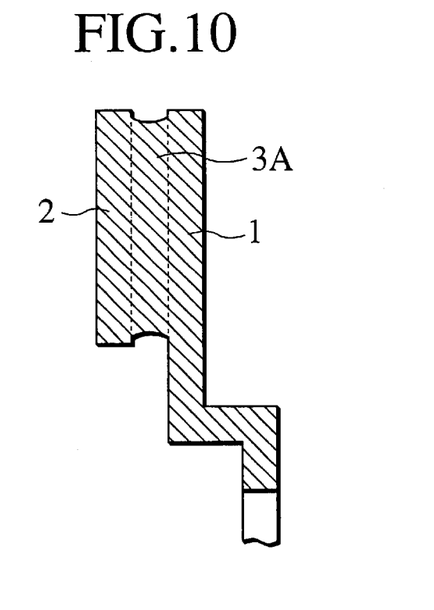
FIG. 10 is a cross section taken along the line A—A of FIG. 9.

The inventors of the present invention have analyzed a ventilated type brake disc rotor as illustrated in FIGS. 9 and 10.

In FIGS. 9 and 10, a brake disc rotor comprises a disc plate 1 on the outer side of a vehicle, a disc plate 2 on the inner side which is opposed to the disc plate 1, and a plurality of fins 3 disposed between the plates 1 and 2. The plurality of fins 3 are arranged at intervals in the circumferential direction of the rotor. Radially extending a ventilator hole passages or 4 are defined between the fins 3. Each ventilator hole 4 is a hole or passage communicating the opening portions at the inner and outer ends in the radial direction of the rotor. A part 3a of the plurality of fins 3 is widened by bridging neighboring fins.

With this construction, when the brake disc rotor rotates, a cooling air passes from the inner periphery of the rotor toward the outer periphery of the rotor along each ventilator hole 4, thereby cooling the brake disc rotor. During braking, both of the disc plates 1 and 2 are tightly sandwiched by sliding pads (not shown) from the right and left sides, that is, from the outer and inner sides of the vehicle.

In the construction, however, since the part 3a of fins is formed in wide, the cooling performance tends to deteriorate as compared with the fins which are not wide. In addition, a thermal non-uniformity occurs in the circumferential direction of the rotor, so that it is not preferable from the viewpoint of thermal deformation strength.

Figure 11:
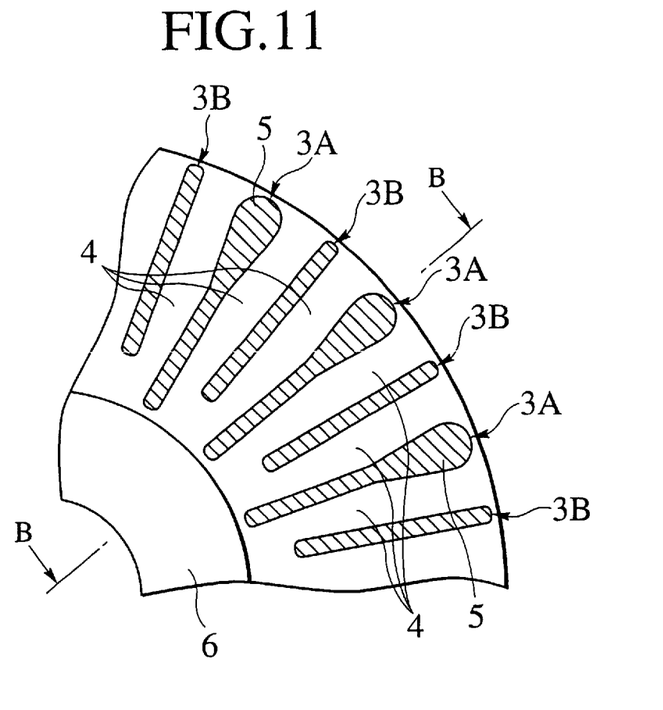
FIG. 11 is a partial cross section of a brake disc rotor examined by the inventors.
Figure 12:
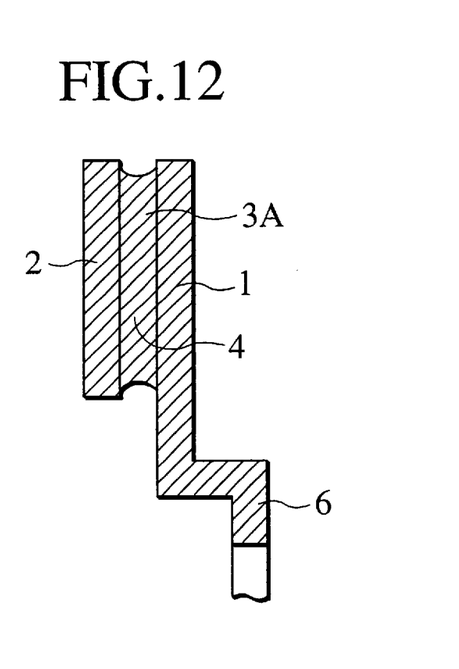
FIG. 12 is a cross section taken along the line B—B of FIG. 11.

The inventors have consequently further analyzed a ventilated type brake disc rotor in which such an aspect is taken into account as shown in FIGS. 11 and 12.

The basic construction of the ventilated type brake disk rotor is similar to that shown in FIGS. 9 and 10. As will be understood from FIGS. 11 and 12, a plurality of long fins 3A having the long fin length and short fins 3B having the short fin length are alternately arranged in the circumferential direction of the rotor. The periphery side of each long fin 3A in the circumferential direction has a wide expanded part 5.

In the construction, the number and area of the ventilation holes 4 are larger than those of the above construction, so that the cooling performance is improved. Since the fins 3A and 3B are not widened extremely, the thermal non-uniformity in the circumferential direction of the rotor is corrected and the thermal deformation strength is also improved.

In the ventilated type brake disc rotor, however, it is considered that there is room for improvement in suppression of brake noise, that is, typically brake squeal.

More specifically, in case of suppressing brake squeal in the frequency band of 5 to 10 kHz, since a brake disc rotor in which the long fins 3A and the short fins 3B are alternately arranged can produce an effect on brake squeal in a higher frequency band, the brake squeal in the frequency band of 5 to 10 kHz can not be sufficiently suppressed. There is consequently the possibility that unpleasant noises occur.

It is also considered that there is room to improve suppression of a so called groan sound caused by thermal deformation of the brake disc rotor.

Figure 13A:
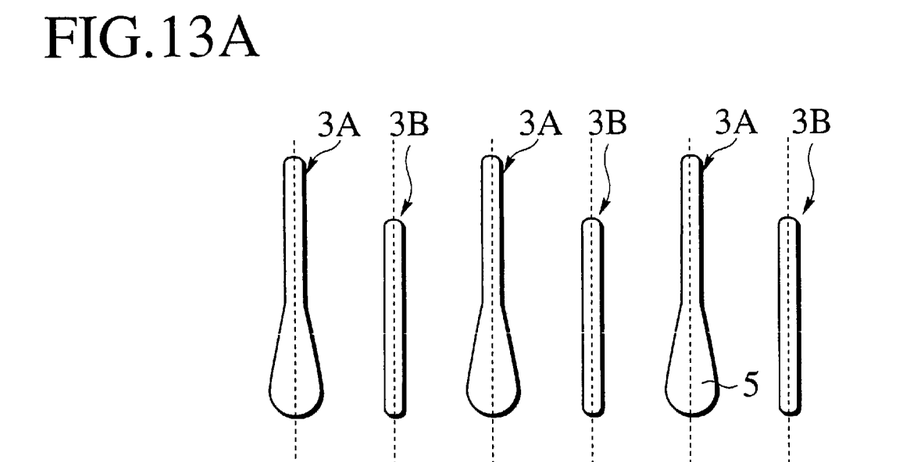
FIG. 13A is a diagram showing an arrangement state of fins of the brake disc rotor examined by the inventors.
Figure 13B:
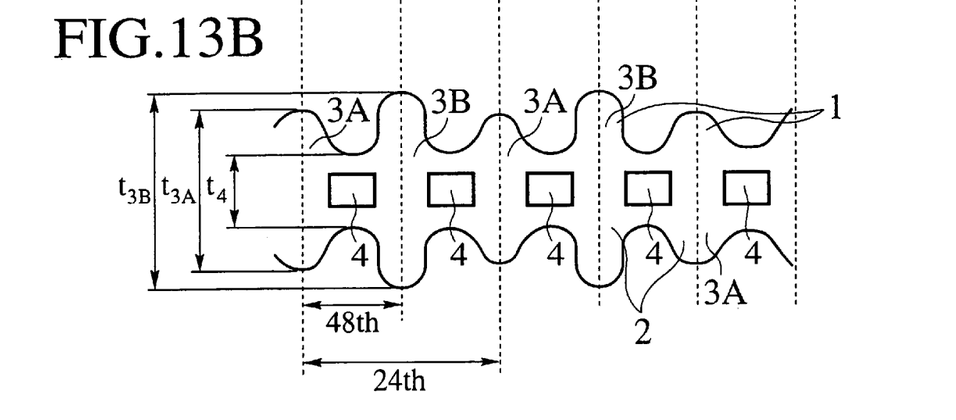
FIG. 13B is a diagram showing a thermal deformation which occurs during braking of the brake disc rotor examined by the inventors.
Figure 14:
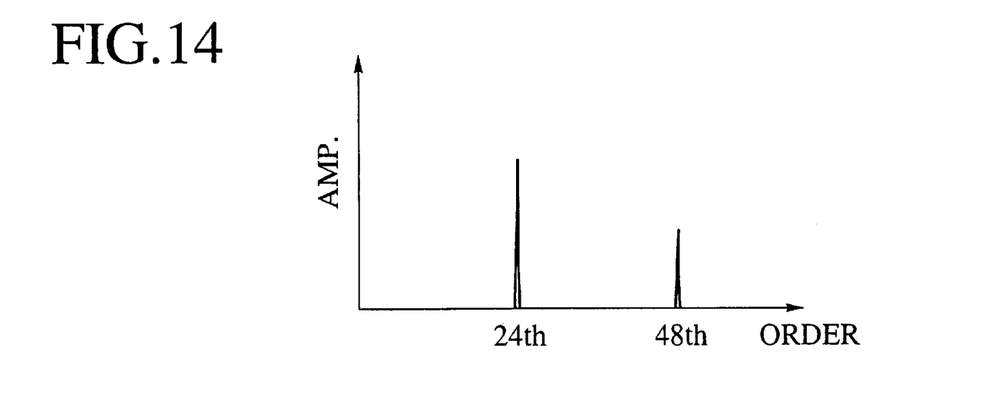
FIG. 14 is a diagram showing an amplitude of a vibration which is caused by the thermal deformation occurring during braking of the brake disc rotor examined by the inventors.

More specifically, as illustrated in FIG. 13A for example, when the fins 3A and 3B of the brake disc rotor are arranged in the circumferential direction of the rotor, it is considered that thermal deformation occurs in such a manner that, as shown in FIG. 13B, parts having the fins 3A and 3B are thick so as to have thickness of $t_{3A}$ and $t_{3B}$, respectively, and a part having the ventilation hole 4 is relatively thin due to influence of heat generated during braking so as to have thickness of $t_4$. In such a case, a vibratory force is created due to the thermal deformation, that is, variation in the thickness of the brake disc rotor. Due to the vibratory force, an uncomfortable noise, that is, the groan sound may occur in the cabin of the vehicle. The thermal deformation basically depends on the number of fins 3A and 3B and their lengths and widths, that is, the rigidity of the disc plates 1 and 2. For example, in a case where the brake disc rotor has 48 fins of the same length, the groan sound appears as the 48th vibration component caused by the thermal deformation. As shown in FIG. 13A, in the construction that the brake disc rotor has the long fins 3A and the short fins 3B, in addition to the 48th vibration component, the 24th vibration component also appear as shown in FIG. 14 where the amplitude of vibration with respect to the order of vibration which is caused by thermal deformation is shown.

The present invention has been achieved based on the analysis above mentioned and it is an object of the present invention to provide a brake disc rotor which can effectively suppress both of brake squeal and groan sound while assuring sufficient cooling performance.

In order to achieve the object, a brake disc rotor of the present invention has a fundamental construction comprising: a first disc plate: a second disc plate facing the first disc plate; a plurality of fins arranged in the radial direction of the brake disc rotor between the first and second disc plates; and a plurality of ventilation holes each of which is positioned between neighboring fins of the plurality of fins and communicates a space on the inner circumferential side and a space on the outer circumferential side in the radial direction of the brake disc rotor. The plurality of fins have a plurality of sets each including two long fins and two short fins, one of the two long fins has an expanded part which is expanded in its width direction, the long fins and the short fins are alternately arranged in the circumferential direction of the brake disc rotor in each of the plurality of sets, and the plurality of sets are arranged at equal intervals in the circumferential direction of the brake disc rotor.

With the construction, both the mass and the rigidity of the portion of the expanded part increase, so that diametral nodal mode (eigermode) of the characteristic vibration of the brake disc rotor which occurs when a vibratory force during braking is applied, that is, the multiple root mode having a quarter wavelength phase difference such that the position of the long fin having the expanded part corresponds to the node position in one of vibration modes and corresponds to the loop position in the other of the vibration modes is separated, and vibrations are not accordingly coupled. The brake squeal can be therefore effectively suppressed.

Further, the four fins constructing one set of fins can employ three kinds regarding the lengths and widths contributing to the rigidity of the disc plates. The vibration energy of the vibratory force can be therefore effectively dispersed into three orders and the groan sound can be effectively suppressed.

And further, since the long fins extending to the inner side of the brake disc rotor and short fins are alternately arranged, the entrance area of the cooling air is enlarged. Also, since the long fins each having the expanded part are included, the flow velocity of the cooling air increases. Thus, the cooling efficiency can be improved, the thermal nonuniformity in the circumferential direction of the brake disc rotor is not substantial, and the thermal deformation strength can be improved.

DETAILED DESCRIPTION OF THE PREFERRED EMBODIMENT

An embodiment of the present invention will be-described in detail herein below with reference to the drawings.

Referring to FIGS. 1 to 8, the construction of the brake disc rotor of the embodiment will be described. In the embodiment, the same elements as those of the above-mentioned brake disc rotors shown in FIGS. 9 to 14 are designated by the same reference numerals and their description is omitted here. Description will be given mainly with respect to different elements.

To be specific, in the embodiment, a set S is comprised of four fins which are arranged in accordance with the order of the long fin 3A, the short fin 3B, the long fin 3A and the short fin 3B periodically arranged so as to have substantially equal intervals in the circumferential direction of the brake rotor. One of the long fins 3A in the set S has the part 5 expanded in the width direction. A plurality of sets S are prepared and periodically arranged so as to have substantially equal intervals in the circumferential direction of the brake rotor.

The total number M of the fins 3A and 3B is (4×2×n) where (n) is the order of the diametral nodal mode in the characteristic vibration in the out-of-plane direction of the rotor face of the brake disc rotor. In the embodiment, the case where n=6 is shown as an example and the total number (M) is set to 48. The interval (d) between the neighboring fins 3A and 3B is 7.5 degrees.

Figure 7:
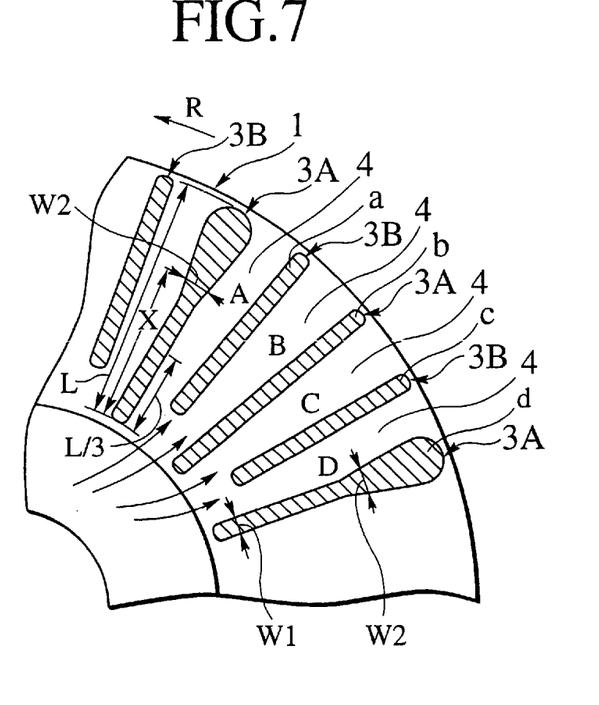
FIG. 7 is a cross section of the main part of the brake disc rotor showing a state where a cooling air flows in ventilation holes of the embodiment.

With respect to the lengths of the long fin 3A and the short fin 3B, namely, the fin length (L) as will be understood from FIG. 7, positions of the fins on the periphery side of the brake disc rotor, that is, the outer ends are set to be almost the same and the positions on the inner side of the brake disc rotor, that is, the inner ends are varied, so that the fins have different lengths. Specifically, the long fin 3A extends to the inner side more than the short fin 3B.

With respect to the long fin 3A having the expanded part 5, as will be understood from FIG. 7, a distance X is determined so as to correspond to that measured from the inner end of the long fin 3A in the radial direction of the brake disc rotor toward the outer side, and a fin width $W_2$ of a portion on the outside of a point that is about ⅓ of the fin length L (X≈L/3), namely, the fin width $W_2$ of the portion corresponding to X>(L/3), is equal to or larger than a fin width W at the end portion on the inner circumferential side of the rotor ($W_2 > W_1$). More specifically, the expanded part 5 is positioned on the peripheral side of the long fin 3A and is formed so as to be gradually wider toward the outer end. On the other hand, each of the long fins 3A having no expanded part 5 and the short fins 3B is formed so as to have an almost same width from the inner end on the inner circumferential side of the rotor to the outer end on the periphery side of the rotor.

In FIGS. 1 to 3B, reference numeral 6 denotes a hat for installing the brake disc rotor to a hub on the axle side of the vehicle. The hat 6 is formed integrally with the disc plate 1 disposed on the outer side of the vehicle.

The operation of the brake disc rotor of the embodiment having such a construction will now be described.

First, a vibration which occurs during sliding of the brake disc rotor of the embodiment will be described.

Figure 1:
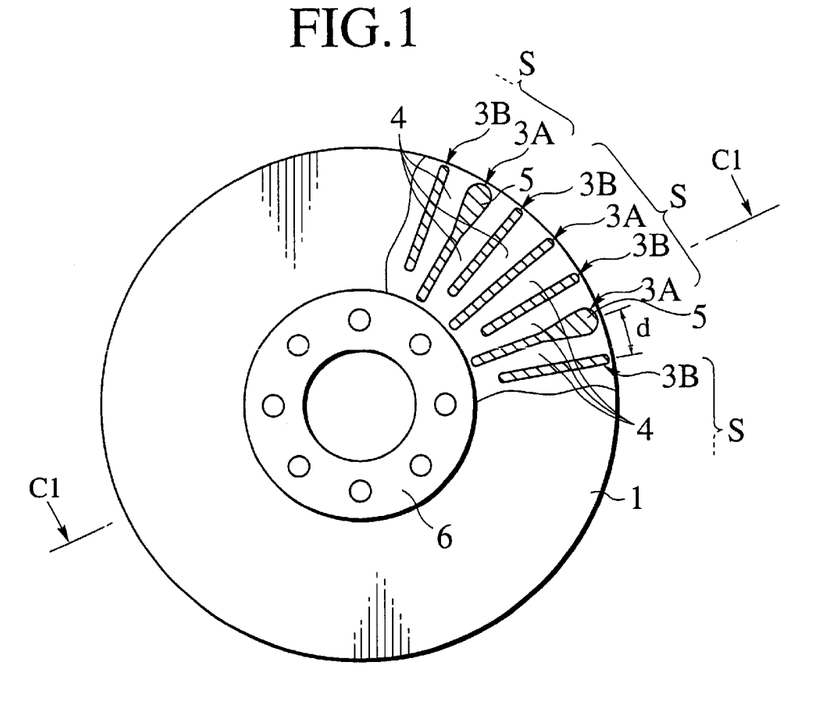
FIG. 1 shows a partially cutaway front view of a brake disc rotor of an embodiment of the invention.
Figure 2:
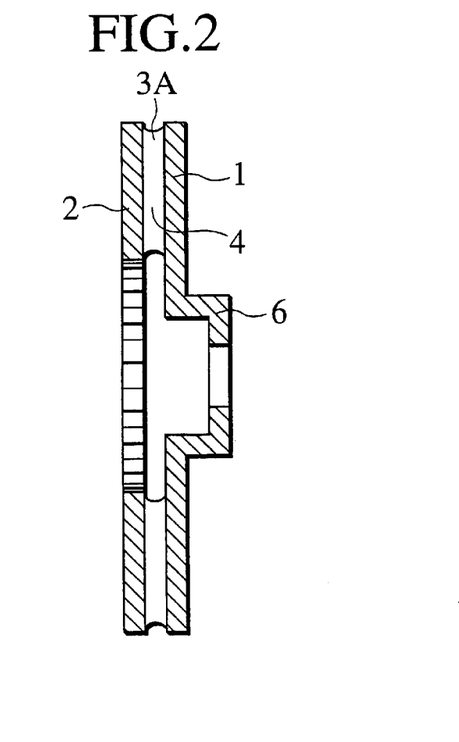
FIG. 2 is a cross section taken along the line C1—C1 of FIG. 1.
Figure 3A:
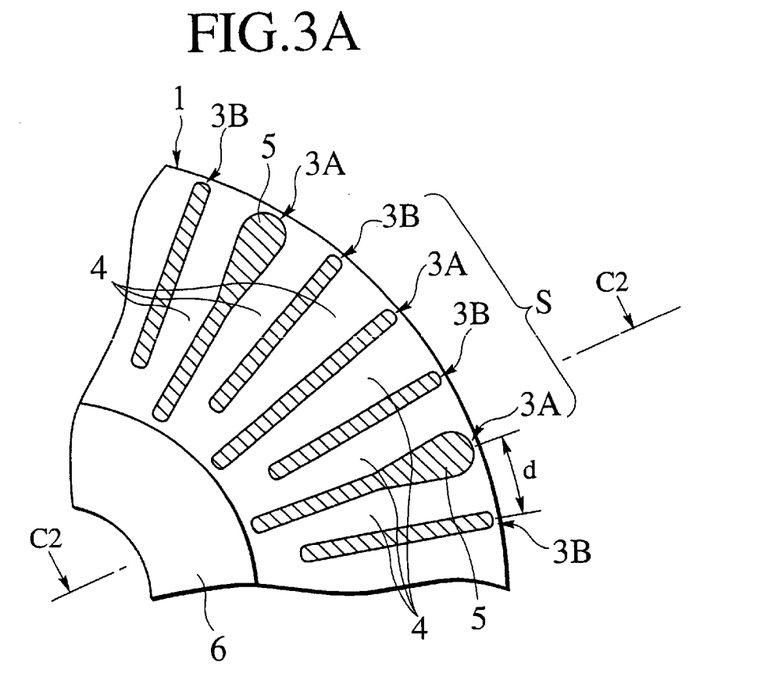
FIG. 3A is a partially enlarged view of FIG. 1.
Figure 3B:
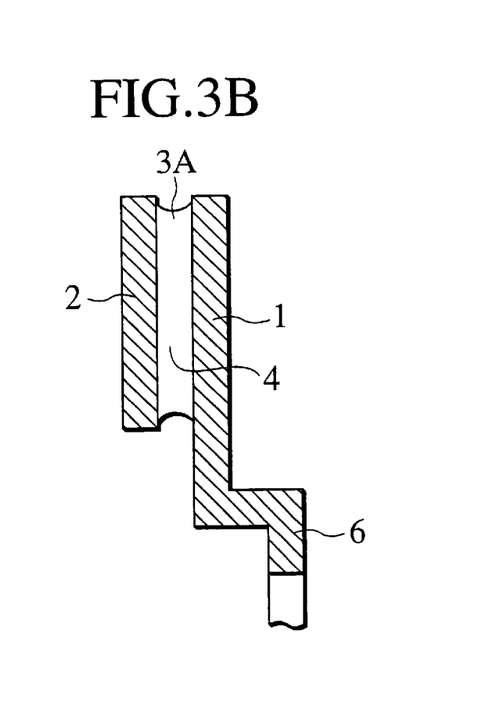
FIG. 3B is a cross section taken along the line C2—C2 of FIG. 3A.
Figure 4:
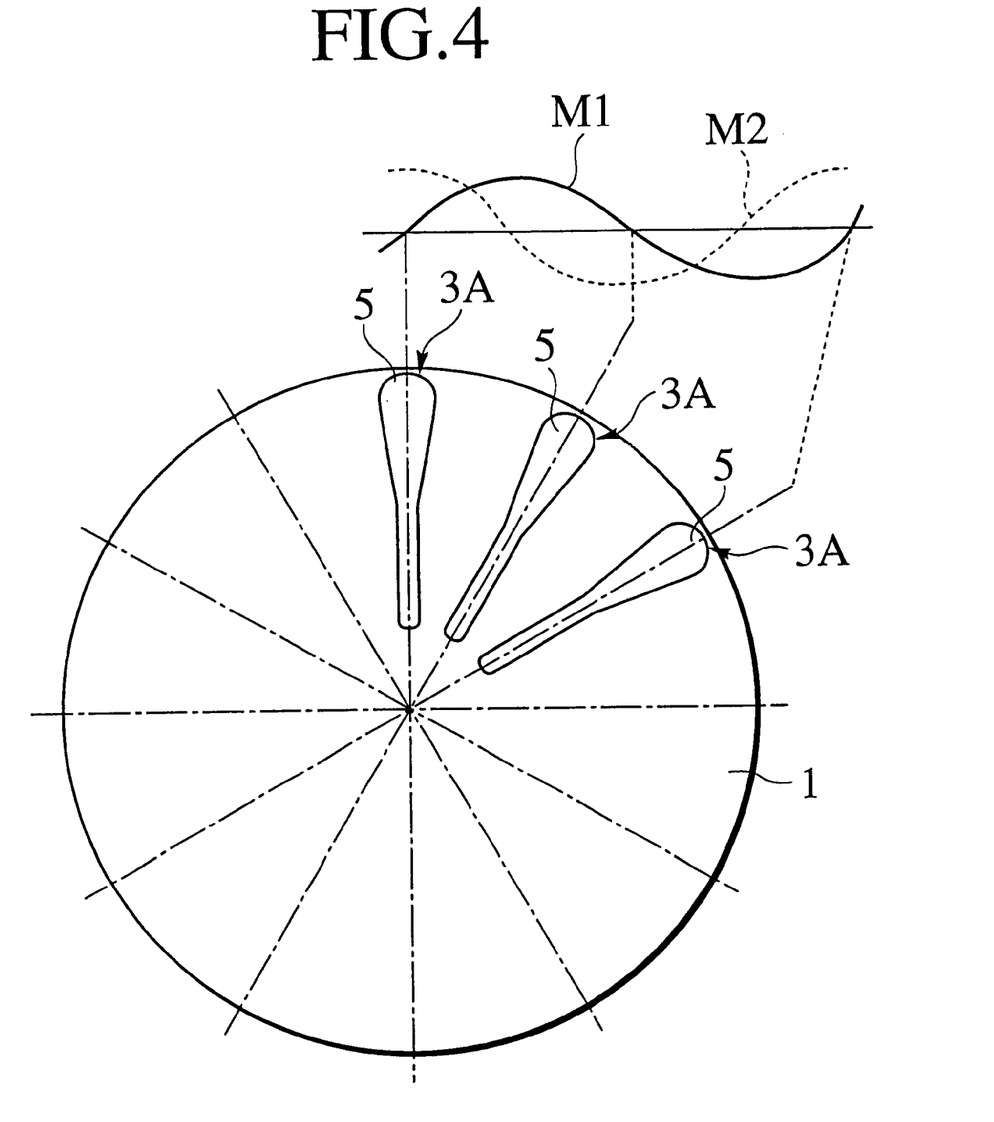
FIG. 4 is a diagram illustrating the positions of long fins each having an expanded part of the brake disc rotor and vibration in the out-of-plane direction of the rotor surface in a diameter nodal mode of the embodiment.

FIG. 4 shows the relation between the positions of the long fins 3A each having the expanded part 5 and a characteristic vibration in the out-of-plane direction of the rotor surface corresponding to brake squeal caused by the vibratory force which occurs during sliding between the disc plates 1 and 2 and brake pads (not shown), that is, in the embodiment, a characteristic vibration in the sixth diameter nodal mode. As will be understood from FIG. 4, the diameter nodal mode of the characteristic vibration of the brake disc rotor is a multiple root mode having a quarter wavelength phase difference. The position of the long fin 3A corresponds, inherently, the node position in one of vibration modes, mode M1, of the multiple root mode and corresponds to the loop position in the other vibration mode M2. The vibration directions in the vibration modes M1 and M2 in FIG. 4 are perpendicular to the faces of the disc plates 1 and 2 of the brake disc rotor.

According to the embodiment, since the long fin 3A has the expanded part 5, both the mass and rigidity of the expanded part 5 and its near part are larger as compared with the case where the long fin 3A does not have the expanded part 5. Consequently, a characteristic value of one of the multiple root modes, M1, does not change and that of the other mode M2 changes, so that the multiple root modes are separated. That is, coupling of the vibrations on the rotor surface by the vibratory force generated during the sliding between both of the disc plates 1 and 2 and the brake pads (not shown) as a cause of the brake squeal can be effectively avoided. Thus, occurrence of the brake squeal near the frequency corresponding to the sixth order diameter nodal mode can be effectively suppressed.

It is generally considered that the frequency to be dealt with for the brake squeal of the vehicle is 5 to 10 kHz. The frequency band corresponds to the fifth to seventh diameter nodal modes. That is, if the fifth to seventh vibration modes can be controlled in practice, it is very effective. For this purpose, in a manner similar to the embodiment, by properly adjusting the total number and positions of the long fins 3A and the short fins 3B and the mass or rigidity of the expanded part 5 and its near part of the long fin 3A, the vibrations on the rotor face in the range of such orders can be prevented from being coupled and the occurrence of the brake squeal around the frequencies corresponding to the diameter nodal modes in the range of such orders can be effectively suppressed.

Specifically, although the embodiment has been described by setting the order (n) of the diameter nodal mode to 6 and the total number (M) of fins to 48, when n =5 and the total number M of fins is 40, brake squeal around the frequency corresponding to the fifth diameter nodal mode can be effectively suppressed. When n =7 and the total number M of fins is 56, brake break around the frequency corresponding to the seventh diameter nodal mode can be effectively suppressed. Obviously, (n) is not limited in the range of the above orders but is principally applicable to the other order as required.

Since the expanded part 5 of the long fin 3A is positioned on the periphery side of the brake disc rotor in the embodiment, the rigidity and mass can be largely changed with respect to the vibration in the diameter nodal mode in which the amplitude in the peripheral part is larger than that in the inner circumferential part of the brake disc rotor. Consequently, such an arrangement effectively contributes to the suppression of the brake squeal.

The thermal deformation of the brake disc rotor of the embodiment will now be described.

Figure 5A:
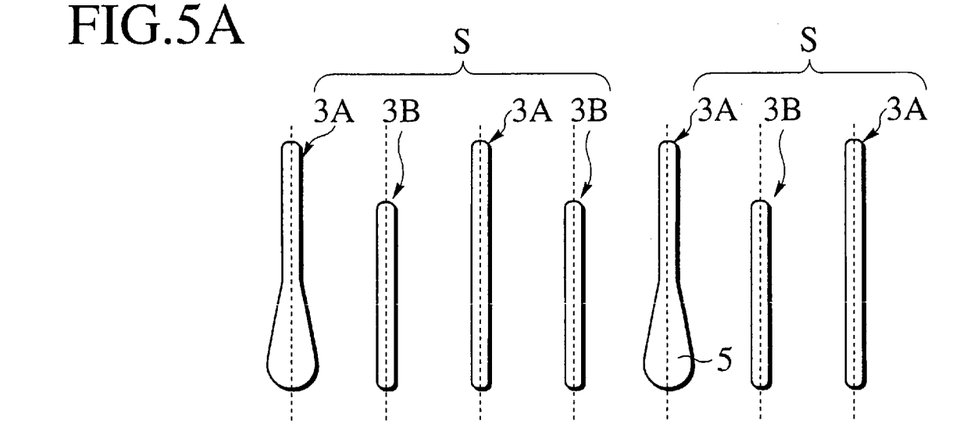
FIG. 5A is a diagram showing an arrangement state of fins of the brake disc rotor of the embodiment.
Figure 5B:
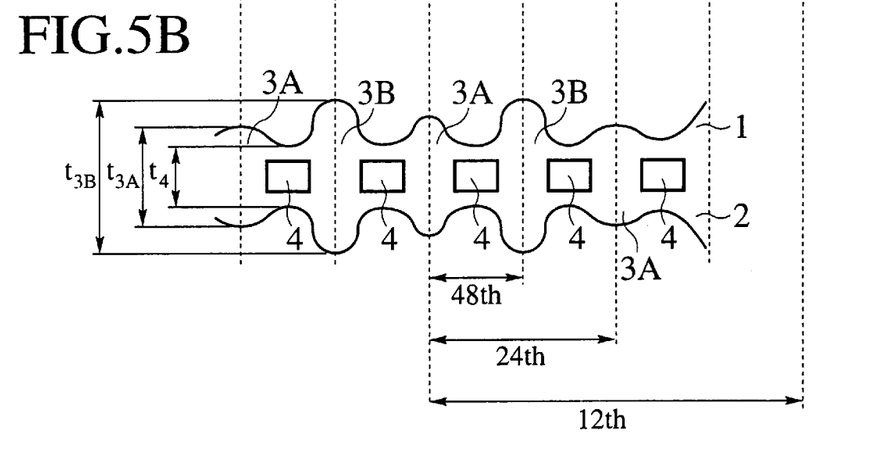
FIG. 5B is a diagram showing a thermal deformation which occurs during braking of the brake disc rotor of the embodiment.

When the fins 3A and 3B of the brake disc rotor are arranged in the above-described sets S in the circumferential direction of the rotor as shown in FIG. 5A, a thermal deformation occurs as shown in FIG. 5B in such a manner that the parts having the fins 3A and 3B have the thickness $t_{3A}$ and $t_{3B}$, respectively, and the part having the ventilation hole 4 has the thickness $t_4$ relatively thin, by the influence of the heat generated during braking.

Such heat deformation is basically decided by the length and width of each of the fins 3A and 3B, that is, the rigidity of the disc plates 1 and 2. In the embodiment, the lengths and widths of the four fins 3A and 3B constructing the set S are classified into three kinds; the long fin 3A which has the expanded part 5, the long fin 3A which does not have the expanded part 5, and the short fin 3B. Since the total number M of fins 3A and 3B is set to 48 in the embodiment, three vibration components of the order of M, the order of M/2, and the order of M/4, that is, the 48th, 24th, and 12th components appear by the thermal deformation.

Figure 6:
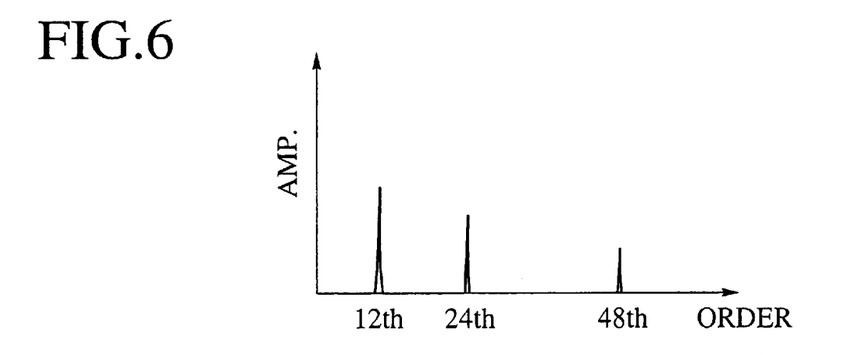
FIG. 6 is a diagram showing an amplitude of a vibration which is caused by the thermal deformation occurring during braking of the brake disc rotor of the embodiment.

Since an energy applied by braking is the same as that of the case of FIGS. 13A and 13B, the energy is dispersed into the three vibration components and the amplitude of each vibration is reduced as a result. Specifically, as will be understood by comparing FIGS. 6 and 14, two 48th and 24th vibration components appear in FIG. 14 and the amplitude of each vibration is relatively large. In FIG. 6, on the contrary, three vibration components of not only the 48th and 24th vibration components but also the 12th vibration component appear and the amplitude of each vibration is relatively small.

According to the embodiment, therefore, the energy upon occurrence of the thermal deformation is dispersed by increasing the kinds of fins 3A and 3B, so that groan sound can be effectively suppressed.

Cooling of the brake disc rotor of the embodiment will now be described.

Figure 8:
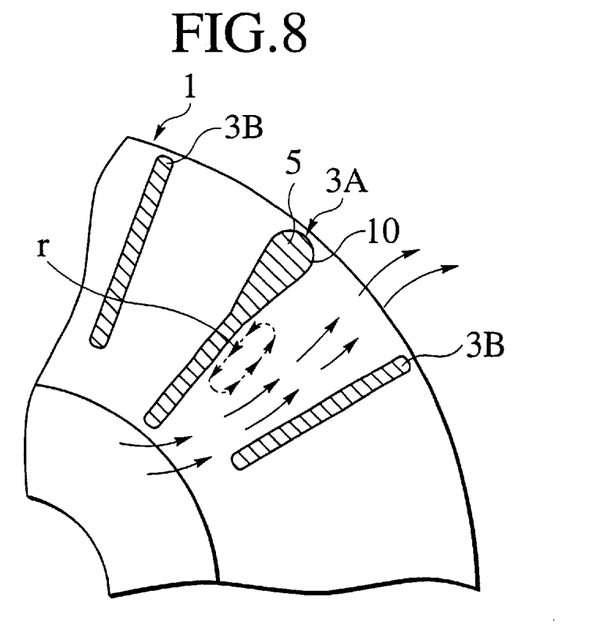
FIG. 8 is an enlarge cross section of the main part of the brake disc rotor showing a state of air currents in the ventilation holes of the embodiment.

Referring to FIGS. 7 and 8, a cooling air flows in each ventilation hole 4 in the direction shown by the arrow from the inner circumferential side of the rotor toward the periphery side of the rotor by the centrifugal force associated with anticlockwise rotation R of the brake disc rotor, thereby cooling the fins 3A and 3B and, that is, cooling the disc plates 1 and 2.

In the embodiment, the long fins 3A and the short fins 3B are arranged so that the inner ends are alternately protruded. Thus the entrance area of the cooling air is accordingly widened, so that preferable cooling performance can be obtained.

Further, since the fin 3A has an inclined face 10 corresponding to the latter half of the flow, as shown in FIG. 8, the cooling air flowed along the fin 3A having the expanded part 5 is attracted by and deflected toward the inclined face 10 by the Coanda effect of fluid. By the deflection of the flow, the pressure in a separated flow area near the inclined face 10 increases and a flow from the inclined face 10 to the inner circumferential side of the rotor along the side face of each fin 3A is created. As a result, an eddy area is formed in addition to the main flow of the cooling air. Thus the induction speed by a rotating flow (r) in the eddy area is added to the flow velocity of the main flow, so that the flow velocity of the main flow increases. On the other hand, by the flow deflected on the periphery side of the rotor, the width of the channel, that is, the channel area is accordingly enlarged as compared with a state of the flow when there is no expanded part 5. Also by decrease in the air-flow resistance in the area, the flow velocity of the main flow increases. As described above, also by the increase in the flow velocity because of the enlargement of the rotation flow and the channel area, the cooling efficiency is improved.

As shown in FIG. 7, when the ventilation holes 4 are distinguished from each other by reference characters A, B, C, and D, since the long fins 3A and the short fins 3B are formed so that their inner ends are alternately protruded, the flow velocity of the cooling air in the channels B and D positioning on the front side of the rotating direction R of the long fins 3A are faster than that in the channels A and C positioning on the front side of the rotation direction R of the short fins 3B. With respect to the two channels B and D of the long fins 3A, the flow velocity in the channel D adjacent to the expanded part 5 is faster than that in the channel B and the order of flow velocity is D>B>A≈C. When the fins 3A and 3B are distinguished from each other by reference characters a, b, c, and d, since the smaller the mass is, each of the fins 3A and 3B cooled by the cooling air is easily cooled, the order of being cooled is opposite to that of flow velocity, namely, a≈c>b>d. In such a case, when considering the fact that the cooling performance of each of the fins 3A and 3B is determined by both of the flow velocity for the fins 3A and 3B and the mass of each of the fins 3A and 3B, it can be evaluated that the cooling performances of the fins 3A and 3B are almost equal. Thus, it can be said that the construction of the embodiment is advantageous because the thermal non-uniformity is substantially eliminated and the thermal deformation strength is preferable.

The entire contents of a Patent Application No. TOKUGANHEI 10-214393, with a filing date of Jul. 29, 1998 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A brake disc rotor comprising:
   a first disc plate;
   a second disc plate opposed to the first disc plate;
   a plurality of fins each of which extends in a radial direction of the brake disc rotor between the first and second disc plates; and
   a plurality of ventilation holes each of which is positioned between neighboring fins,
   wherein the plurality of fins are arranged in a plurality of sets wherein the plurality of sets are arranged sequentially in an alternating pattern in a circumferential direction of the brake disc rotor and each of the plurality of sets includes two long fins and two short fins,
   wherein one of the two long fins has an expanded wide part and wherein the other of the two long fins is free of an expanded wide part,
   wherein the two long fins and the two short fins are arranged in each of the plurality of sets in such a manner that the other of the two long fins, one of the two short fins, the one of the two long fins with the expanded wide part and the other of the two short fins are sequentially arranged in the circumferential direction of the brake disc rotor, or in such a manner that the one of the two long fins, one of the two short fins, the other of the two long fins and the other of the two short fins are sequentially arranged in the circumferential direction of the brake disc rotor.

2. A brake disc rotor according to claim 1, wherein the one of the two long fins having the expanded wide part and the other of the two long fins wherein an expanded wide part is absent are alternatively arranged in the circumferential direction of the brake disc rotor to interpose one of the two short fins therebetween.

3. A brake disc rotor according to claim 1, wherein the expanded part is positioned on a radially outer end of a long fin.

4. A brake disc rotor according to claim 1, wherein the total number of the plurality of fins is 4×2×n where (n) is the subjective order of a diametral nodal mode of vibration of the brake disc rotor.

5. A brake disc rotor according to claim 4, wherein the subjective order (n) of the diametral nodal mode of the vibration of the brake disc rotor is 5, and each of the first disc plate and the second disc plate is circular disc.

6. A brake disc rotor according to claim 4, wherein the subjective order (n) of the diametral nodal mode of the vibration of the brake disc rotor is 6, and each of the first disc plate and the second disc plate is circular disc.

7. A brake disc rotor according to claim 4, wherein the subjective order (n) of the diameter nodal mode of the vibration of the brake disc rotor is 7, and each of the first disc plate and the second disc plate is circular disc.

8. A brake disc rotor according to claim 1, wherein a position of the outer end in the radial direction of the brake disc rotor of the long fin and a position of the outer end in the radial direction of the brake disc rotor of the short fin, are substantially equal.

9. A brake disc rotor according to claim 1, wherein the expanded wide part is located at the radially outward end of the one of the two long fins and is substantially ⅓ of a length of the one of the two fins.

10. A brake disc rotor according to claim 9, wherein the width of the expanded part gradually increases in the radial direction of the brake disc rotor.

11. A brake disc rotor according to claim 1, wherein radially inner ends of the long fins are positioned radially inward of the radially inner ends of the short fins.

12. A brake disc rotor according to claim 1, wherein the expanded part has a surface inclined with respect to the radial direction of the brake disc rotor.

13. A brake disc rotor according to claim 12, wherein the expanded part further has a round portion at the outer end thereof.

14. A brake disc rotor according to claim 1, wherein the expanded part generates a rotating air flow pattern.

15. A brake disc rotor comprising:
   a first disc plate:
   a second disc plate opposed to the first disc plate; and
   ventilating means for ventilating the brake disc rotor, the ventilating means having a plurality of fins and a plurality of ventilation holes, each of the plurality of fins extending in a radial direction of the brake disc rotor between the first and second disc plates, and each of the plurality of ventilation holes comprising a space formed with the first and second disc plates and neighboring fins of the plurality of fins through which air can flow,
   wherein there are a plurality of sets of fins each containing two long fins and two short fins, one of the two long fins having an expanded wide part which is expanded in a circumferential direction of the brake disc rotor, which is positioned on a radially outer portion of the one of the two long fins, and which is formed so as to gradually widen toward an outer end of the one of the two long fins, while the expanded wide part being absent in the other of the two long fins,
   wherein the plurality of sets are sequentially arranged in an alternating pattern in a circumferential direction of the brake disc rotor,
   and the two long fins and the two short fins are arranged in each of the plurality of sets in such a manner that the other of the two long fins, one of the two short fins, the one of the two long fins and the other of the two short fins are sequentially arranged in the circumferential direction of the brake disc rotor, or in such a manner that the one of the two long fins, one of the two short fins, the other of the two long fins and the other of the two short fins are sequentially arranged in the circumferential direction of the brake disc rotor.

16. A vibration control method of a brake disc rotor, the brake disc rotor having a first disc plate and a second disc plate opposed to the first disc plate, the method comprising:

forming a plurality of fins each of which extends in a radial direction of the brake disc rotor between the first and second disc plates;

forming a plurality of ventilation holes each of which comprises a space formed with the first and second disc plates and neighboring fins of the plurality of fins, and communicates a space on an inside of the brake disc rotor and a space on an outer periphery of the brake disc rotor;

arranging the plurality fins into a plurality of sets each containing two long fins and two short fins, the plurality of sets being sequentially arranged in an alternating pattern in a circumferential direction of the brake disc rotor;

arranging one of the two long fins to have an expanded wide part which expands in the circumferential direction of the brake disc rotor, positioned on a radially outer portion of the one of the two long fins, and formed so as to gradually widen as the one of the two long fins expands toward a radially outer end of the one of the two long fins; and arranging the two long fins and the two short fins in each of the plurality of sets in such a manner that the other of the two long fins, one of the two short fins, the one of the two long fins and the other of the two short fins are sequentially arranged in the circumferential direction of the brake disc rotor, or in such a manner that the one of the two long fins, one of the two short fins, the other of the two long fins and the other of the two short fins are sequentially arranged in the circumferential direction of the brake disc rotor.

17. A brake disc rotor comprising:

a first disc plate;

a second disc plate opposed to the first disc plate; and a plurality of radially extending fins which extend between the first and second disc plates to define a plurality of radially extending ventilation holes therebetween;

wherein the plurality of fins comprise a plurality of long fins and a plurality of short fins which are shorter than the long fins, wherein each long fin is located between two short fins, wherein each short fin is located between two long fins, and wherein only every other long fin is provided with an expanded wide part.

* * * * *